US009469716B2

(12) United States Patent
Blum et al.

(10) Patent No.: US 9,469,716 B2
(45) Date of Patent: Oct. 18, 2016

(54) SINGLE-COMPONENT POLYURETHANE SYSTEM COMPRISING AQUEOUS OR WATER-SOLUBLE POLYURETHANES

(75) Inventors: Harald Blum, Hafenlohr (DE); Heino Müller, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 527 days.

(21) Appl. No.: 12/425,584

(22) Filed: Apr. 17, 2009

(65) Prior Publication Data
US 2009/0264577 A1 Oct. 22, 2009

(30) Foreign Application Priority Data

Apr. 18, 2008 (EP) ..................... 08007569

(51) Int. Cl.
| | | |
|---|---|---|
| C08G 18/08 | (2006.01) |
| C08G 18/12 | (2006.01) |
| C08G 18/28 | (2006.01) |
| C08G 18/40 | (2006.01) |
| C08G 18/42 | (2006.01) |
| C08G 18/44 | (2006.01) |
| C08G 18/48 | (2006.01) |
| C08G 18/66 | (2006.01) |
| C08G 18/78 | (2006.01) |
| C08G 18/79 | (2006.01) |
| C08G 18/80 | (2006.01) |
| C09D 175/06 | (2006.01) |

(52) U.S. Cl.
CPC ........... *C08G 18/12* (2013.01); *C08G 18/0823* (2013.01); *C08G 18/283* (2013.01); *C08G 18/4018* (2013.01); *C08G 18/4211* (2013.01); *C08G 18/4238* (2013.01); *C08G 18/44* (2013.01); *C08G 18/4825* (2013.01); *C08G 18/6655* (2013.01); *C08G 18/6659* (2013.01); *C08G 18/7831* (2013.01); *C08G 18/792* (2013.01); *C08G 18/8077* (2013.01); *C09D 175/06* (2013.01)

(58) Field of Classification Search
CPC  C08G 18/12; C08G 18/0823; C08G 18/283; C08G 18/4018; C08G 18/4211; C08G 18/4238; C08G 18/44; C08G 18/4825; C08G 18/6655; C08G 18/6659; C08G 18/7831; C08G 18/792; C08G 18/8077; C09D 175/06
USPC ...... 524/589, 590, 591, 839, 840; 428/423.1
See application file for complete search history.

(56) References Cited

U.S. PATENT DOCUMENTS

| | | | |
|---|---|---|---|
| 4,066,591 A * | 1/1978 | Scriven et al. ............... 524/840 |
| 4,108,814 A | 8/1978 | Reiff et al. | |
| 5,563,206 A | 10/1996 | Eicken et al. | |
| 5,905,132 A | 5/1999 | Wegner et al. | |
| 6,566,444 B1 | 5/2003 | Göbel et al. | |
| 6,930,161 B2 | 8/2005 | Schwarte et al. | |
| 2005/0154177 A1 | 7/2005 | Hille et al. | |
| 2005/0182188 A1* | 8/2005 | Rische ............... C08G 18/0819 524/589 |
| 2009/0264587 A1* | 10/2009 | Blum et al. ................... 524/591 |

FOREIGN PATENT DOCUMENTS

| | | |
|---|---|---|
| CA | 2253119 A1 | 5/1999 |
| DE | 2446440 A | 4/1976 |
| DE | 4237965 A1 | 5/1994 |
| DE | 4337961 A1 | 5/1995 |
| DE | 19849207 A1 | 4/2000 |
| DE | 10147546 A1 | 4/2003 |
| DE | 10214028 A1 | 10/2003 |
| EP | 0916647 A2 | 5/1999 |
| WO | WO-00/24797 A1 | 5/2000 |
| WO | WO-03/080694 A1 | 10/2003 |
| WO | WO-2007/005808 A2 | 1/2007 |

* cited by examiner

*Primary Examiner* — Patrick Niland

(74) *Attorney, Agent, or Firm* — Drinker Biddle & Reath LLP

(57) ABSTRACT

The present invention relates to innovative single-component polyurethane systems based on water-soluble polyurethanes or their aqueous solutions, to a process for preparing them, and to the use.

11 Claims, No Drawings

SINGLE-COMPONENT POLYURETHANE SYSTEM COMPRISING AQUEOUS OR WATER-SOLUBLE POLYURETHANES

RELATED APPLICATIONS

This application claims benefit to European Patent Application No. 08007569.0, filed Apr. 18, 2008, which is incorporated herein by reference in its entirety for all useful purposes.

BACKGROUND OF THE INVENTION

The present invention relates to innovative single-component polyurethane systems based on water-soluble polyurethanes or their aqueous solutions, to a process for preparing them, and to the use.

Aqueous binders based on polyurethane dispersions are well-established prior art and are described for example in Houben-Weyl, Methoden der organischen Chemie, 4. ed. volume E 20, p. 1659 (1987), J. W. Rosthauser, K. Nachtkamp in "Advances in Urethane Science and Technology", K. C. Frisch and D. Klempner, Editors, Vol. 10, pp. 121-162 (1987) or D. Dietrich, K. Uhlig in Ullmann's Encyclopedia of Industrial Chemistry, Vol. A 21, p. 677 (1992).

In this context, amino alcohols are synthesis components often described. Thus DE-A 4237965 describes aqueous polyurethane dispersions which are obtained by reaction of di- or polyisocyanates, hydrophobic polyols containing dimer diol and hydrophilicizing compounds. The examples describe dispersion with fairly low solids contents of 25% to 40% by weight, but the use of hydrophobic diols containing dimer diols, which is essential to the invention, severely limits the variability of such products. Any possible and described reaction of the isocyanate-functional intermediate with amino alcohols prior to dispersing is not an essential part of the invention, since trials can be used as well and also since direct dispersing and reaction with water is possible.

DE-A 4337961 describes aqueous coating materials comprising water-dilutable polyurethane resin, preparable by reaction of polyisocyanate, hydrophilicizing components, polyester polyols and/or polyether polyols if desired, and low molecular weight polyols if desired, to give an isocyanate-functional prepolymer having an acid number of 18 to 70 mg KOH/g, some of the isocyanate groups being reacted in a further step with blocking agent, with addition, if desired, of further polyisocyanate and subsequent reaction with compounds having at least one primary or secondary amino group and at least one hydroxyl group. This gives polyurethane dispersions which are self-crosslinking under baking conditions (at 160° C. in the examples), in other words dispersions in which one molecular contains not only hydroxyl groups but also blocked isocyanate groups, having relatively low solids contents (37% to 42% by weight in the examples) for baking enamels, especially for baking surfacers in automotive finishing. In view of the low amounts of amino alcohols incorporated, the urea group contents, the functionalities relative to hydroxyl groups, and the hydroxyl group contents are low.

DE-A 10214028 describes polyurethanes for water-dilutable surfacer compositions in automotive finishing, have a solids content of greater than 50% by weight which under baking conditions of from 140° C. meet the requirements concerning stone-chip resistance and exhibit overbake stability. It is described how such high solids contents are not achievable with water-dispersible polyurethanes containing neutralized dimethylolpropionic acid as a hydrophilicizing agent. The water-dilutable polyurethanes of the invention, having at least two free hydroxyl groups, are obtained by reaction of alkanol amines with an NCO compound to give a hydroxy-functional intermediate, followed by the addition reaction of a cyclic carboxylic anhydride with the hydroxyl groups, to form ester linkages. The carboxyl and/or carboxylate groups necessary for the dispersing of the polyurethane are therefore incorporated into the polymer via an acid anhydride. This type of acidification via anhydrides leads to the incorporation of the hydrophilicizing compound by way of monoester bonds. It is known that structures of this kind are sensitive to hydrolysis, and therefore the durability of such dispersions is very limited. In the examples, polyurethane dispersions are obtained which have solids contents of 43% to 45% by weight. High functionalities and high hydroxyl group contents are not achievable by this route, since some of the hydroxyl groups are consumed by the reaction with the acid anhydride.

DE-A 10147546 describes self-crosslinking polyurethanes in organic solution, obtained by reaction of special aliphatic-aromatic polyester, partially blocked polyisocyanate and a compound having at least two isocyanate-reactive groups, such as an amino alcohol, for example, which, when used as base coat material, are said to have advantageous properties and which possess good CAB compatibility. The polyurethanes are in solution in relatively large amounts of organic solvents and therefore no longer meet the present-day requirements in relation to emissions reduction.

DE-A 19849207 describes water-thinnable binder compositions comprising water-dilutable polyurethane urea paste resins and polyether polyols for the formulation of pigments paste for incorporation into aqueous coating compositions. The water-dilutable polyurethane urea paste resins described are reaction products of polyol, hydrophilicizing component, polyisocyanate and hydroxy amine and additionally comprise a further polyether polyol component. Suitable hydroxy-functional monoamines are amines with primary amino groups and amines with secondary amino groups. According to the disclosure, polyurethane dispersions are obtained therefrom that contain preferably organic solvents and have solids contents of up to 50%, preferably up to 42%, by weight. The polyurethane dispersions prepared in the examples have solids contents of 30% to 35% by weight and also NMP contents of approximately 6% by weight. These products therefore no longer satisfy modern-day requirements in relation to solvent content and high solids content, and, moreover, the mandatory use of polyether polyols restricts the possible uses to applications in which light fastness and weathering stability are of minor importance.

Despite the fact that the prior art concerning aqueous polyurethane dispersions is very extensive, there continues to be a great demand for improved aqueous products. Required in particular are low to zero emissions, high solids contents, high processing reliability and robustness to external influences, as for example to fluctuating levels of atmospheric humidity or low storage temperatures, high coat thicknesses achievable without defects, stability to hydrolysis, excellent film-mechanical properties, and frequently, in addition, high crosslinking densities and/or high functionalities.

A problem affecting disperse systems such as those of the kind identified above is the fact that, for actual film formation during the coating operation, the coalescence and filming of the disperse polymer particles must take place in such a way as to produce a homogeneous, optically flawless film. Owing to the complexity of the operation, this is significantly more difficult and affected by error than in a case of systems in which the film-forming polymer is in a dissolved state.

In contrast to solutions of polyurethanes in organic solvents, high-quality polyurethane solutions in water have been hitherto unknown.

It was an object of the present invention, then, to provide aqueous single-component polyurethane systems having improved film-forming properties, which meet the above-mentioned requirements and which are suitable for optically flawless coatings with an advantageous profile of properties, for example, for use in enameling.

EMBODIMENTS OF THE INVENTION

An embodiment of the present invention is a polyurethane system comprising
- A) a water-soluble, hydroxy-functional polyurethane containing urea groups and having a hydroxyl group content in the range of from 2% to 10% by weight and a level of urea groups, calculated as —NH—CO—NH—, derived from amino alcohols having a primary or secondary amino group and at least one hydroxyl group in the range of from 3% to 20% by weight, based in each case on the weight of said hydroxy-functional polyurethane containing urea groups, and/or an aqueous solution of said water-soluble, hydroxy-functional polyurethane containing urea groups;
- B) a crosslinker which contains no free isocyanate groups and is optionally hydrophilicized; and
- C) optionally, further aqueous dissolved and/or dispersed and/or organically dissolved, optionally hydroxy-functional oligomers and/or polymers.

Another embodiment of the present invention is the above polyurethane system, wherein said polyurethane system comprises
- A) from 30% to 98% by weight of said water soluble, hydroxy-functional polyurethane containing urea groups and/or an aqueous solution of said water-soluble, hydroxy-functional polyurethane containing urea groups;
- B) from 2% to 70% by weight of an optionally hydrophilicized polyisocyanate crosslinker having blocked isocyanate groups and/or amino resin crosslinkers and/or urea resin crosslinkers; and
- C) from 0% to 65% by weight of other aqueous or organically dissolved and/or dispersed, optionally hydroxyl-functional oligomers and/or polymers;

wherein the sum of the percentages of A), B), and C) equal 100% by weight and is based on the solids content of said polyurethane system.

Another embodiment of the present invention is the above polyurethane system, wherein said water-soluble, hydroxy-functional polyurethane containing urea groups is obtained by preparing a NCO-functional prepolymer by single-stage or multi-stage reaction of
- a) at least one hydroxy- and/or amino-functional hydrophilicizing agent having at least one acid group and/or the salt of an acid group, or having at least one tertiary amino group and/or the salt of a tertiary amino group;
- b) at least one polyol;
- c) at least one polyisocyanate; and
- d) optionally, other hydroxy- and/or amino-functional compounds, different from a), b), and e);

and reacting said NCO-functional prepolymer with
- e) an amino alcohol component comprising an amino alcohol having a primary or secondary amino group and at least one hydroxyl group, wherein the fraction of amino alcohols having a secondary amino group, based on the total amount of e), is at least 60% by weight;

wherein the tertiary amino groups or acid groups in the resulting water soluble, hydroxy-functional polyurethane containing urea groups which originate from a) are optionally present in their salt form as a result of whole or partial neutralization.

Another embodiment of the present invention is the above polyurethane system, wherein said water-soluble, hydroxy-functional polyurethane containing urea groups is obtained by preparing a NCO-functional prepolymer by single-stage or multi-stage reaction of
- a) at least one hydroxy- and/or amino-functional hydrophilicizing agent having at least one acid group and/or the salt of an acid group, or having at least one tertiary amino group and/or the salt of a tertiary amino group;
- b) at least one polyol;
- c) at least one polyisocyanate; and
- d) optionally, other hydroxy- and/or amino-functional compounds, different from a), b), and e);

reacting said NCO-functional prepolymer with
- e) an amino alcohol component comprising an amino alcohol having a primary or secondary amino group and at least one hydroxyl group, wherein the fraction of amino alcohols having a secondary amino group, based on the total amount of e), is at least 60% by weight;

and dissolving the resulting water soluble, hydroxy-functional polyurethane containing urea groups in water, wherein said dissolution is preceded or accompanied by the reaction of the acid groups or tertiary amino groups of a) with a neutralizing agent.

Another embodiment of the present invention is the above polyurethane system, wherein e) is an amino alcohol having exclusively one secondary amino group and one or two hydroxyl groups.

Another embodiment of the present invention is the above polyurethane system, wherein B) is an amino crosslinker resin and/or a urea crosslinker resin or a crosslinker resin containing blocked NCO groups.

Yet another embodiment of the present invention is a polyurethane obtained from the above polyurethane system.

Another embodiment of the present invention is the above polyurethane, wherein said polyurethane is a paint, coating material, sealant, liquid ink, printing ink, size, adhesion promoter, or reactive diluent applied in one or more layers.

Yet another embodiment of the present invention is a substrate coated with the above polyurethane.

DESCRIPTION OF THE INVENTION

It has now been found that this can be achieved by means of innovative water-soluble polyurethane polyureas or their solutions.

The present invention therefore provides single-component polyurethane systems comprising at least
- A) water-soluble hydroxy-functional polyurethanes containing urea groups and having hydroxyl group contents of 2% to 10% by weight and levels of urea groups (calculated as —NH—CO—NH—) derived from amino alcohols having a primary or secondary amino group and at least one hydroxyl group of 3% to 20% by weight, based in each case on the hydroxy-functional polyurethane, or their aqueous solutions, containing urea groups, and
- B) crosslinkers which contain no free isocyanate groups and are optionally hydrophilicized and C) if desired, further aqueous dissolved and/or dispersed and/or organically dissolved, optionally hydroxy-functional oligomers and/or polymers.

The one-component polyurethane systems of the invention are storage-stable over a relatively long period of time both at room temperature and also, in general, at up to 40 or even 50° C.

Typical curing temperatures are 70 to 250° C., preferably 90 to 180° C.

The ultimate properties and also the cure rate and the storage stability as well can be influenced by addition of catalysts. Examples of catalysts suitable in principle are tertiary amines such as diazabicyclononane; diazabicycloundecane, triethylamine, ethyldiisopropylamine, metal compounds based on tin, such as tin(II) octoate, dibutyltin dilaurate, tin chloride, based on zinc, magnesium, zirconium, bismuth, molybdenum, such as lithium molybdate, for example, and on other metals as well. Typical amounts for use are 0.001% to 1% by weight, based on the solids content of the formulation to be cured.

Preferably such one-component polyurethane systems of the invention contain
A) 30% to 98% by weight of the hydroxy-functional polyurethanes containing urea groups, and/or their solutions, which are essential to the invention,
B) 2% to 70% by weight of optionally hydrophilically modified polyisocyanate crosslinkers having blocked isocyanate groups, and/or amino and/or urea resin crosslinkers and
C) 0% to 65% by weight of other aqueous or organically dissolved and/or dispersed, optionally hydroxyl-functional oligomers and/or polymers, the percentages adding up to 100% by weight and being based on the solids content of the formulation.

With particular preference such one-component polyurethane systems of the invention contain
45% to 95% by weight of component A),
5% to 55% by weight of component B),
0% to 50% by weight of component C),
the percentages adding to 100% by weight and being based on the solids content of the formulation.

The water-soluble hydroxy-functional polyurethanes containing urea groups, which polyurethanes are essential to the invention, can be obtained by
a) at least one hydroxy- and/or amino-functional hydrophilicizing agent having at least one acid group and/or the salt of an acid group, or having at least one tertiary amino group and/or the salt of a tertiary amino group,
b) at least one polyol
c) at least one polyisocyanate
d) if desired, other hydroxy- and/or amino-functional compounds, different from the compounds of components a), b) and e)
and their reaction
e) with an amino alcohol component, comprising amino alcohols having a primary or secondary amino group and at least one hydroxyl group, the fraction of amino alcohols having a secondary amino group, based on the total amount of component e), being at least 60% by weight,
it being possible for the tertiary amino groups or acid groups originating from the compounds of component a), in the hydroxy-functional polyurethane containing urea groups, to be present in their salt form as a result of whole or partial neutralization.

The polyurethanes which are essential to the invention may be used in the form of their aqueous solutions in component A. They are obtainable by preparing NCO-functional prepolymers by reacting
a) at least one hydroxy- and/or amino-functional hydrophilicizing agent having at least one acid group and/or the salt of an acid group, or having at least one tertiary amino group and/or the salt of a tertiary amino group,
b) at least one polyol
c) at least one polyisocyanate
d) if desired, other hydroxy- and/or amino-functional compounds, different from the compounds of components a), b) and e)
and reacting these prepolymers
e) with an amino alcohol component, comprising amino alcohols having a primary or secondary amino group and at least one hydroxyl group, the fraction of amino alcohols having a secondary amino group, based on the total amount of component e), being at least 60% by weight,
and dissolving the resulting hydroxy-functional polyurethanes containing urea groups
f) in water, the dissolution operation in water being preceded or accompanied by the reaction of the acid groups or tertiary amino groups of the hydrophilicizing agents a) with a neutralizing agent.

The hydrophilicizing agents used in a) may contain carboxylic or sulfonic acid groups and/or their corresponding acid anions as the acid group for anionic hydrophilicizing. For cationic hydrophilicizing it is possible for the compounds of component a) to contain tertiary amino groups or the correspondingly protonated quaternary ammonium groups.

The compounds of component a) are used in the process of the invention typically in amounts of 0.5% to 10%, preferably 1% to 8% and more preferably 2% to 7% by weight, based on the hydroxy-functional polyurethanes containing urea groups.

Suitable hydrophilicizing agents a) are mono- and dihydroxycarboxylic acids, mono- and diaminocarboxylic acids, mono- and dihydroxysulfonic acids, mono- and diaminosulfonic acids and also mono- and dihydroxyphosphonic acids or mono- and diaminophosphonic acids and their salts, such as dimethylolpropionic acid, dimethylolbutyric acid, dimethylolacetic acid, 2,2-dimethylolpentanoic acid, dihydroxysuccinic acid, hydroxypivalic acid, N-(2-aminoethyl)alanine, 2-(2-aminoethylamino)ethanesulfonic acid, ethylenediaminepropyl- or -butylsulfonic acid, 1,2- or 1,3-propylenediamineethylsulfonic acid, malic acid, citric acid, glycolic acid, lactic acid, glycine, alanine, taurine, lysine, 3,5-diaminobenzoic acid, 6-aminohexanoic acid, 11-aminoundecanoic acid, aminoacetic acid, an adduct of IPDA, hexamethylenediamine or other diamines and acrylic acid (EP-A 0 916 647, example 1) and its alkali metal salts and/or ammonium salts; the adduct of sodium bisulfite with but-2-ene-1,4-diol, polyethersulfonate, the propoxylated adduct of 2-butenediol and $NaHSO_3$, described for example in DE-A 2 446 440 (page 5-9, formula I-III) and/or the salts of the hydrophilicizing agents described, and also mixtures of the hydrophilicizing agents stated and, if appropriate, of other hydrophilicizing agents too.

Suitable hydrophilicizing agents a) are likewise cationic hydrophilicizing agents such as mono-, di- or trihydroxyfunctional tertiary amines and mono-, di- or triamino-functional tertiary amines and their salts, such as N-methyldiethanolamine, N-ethyldiethanolamine, N-methyldiisopropanolamine, trisopropanolamine, triethanolamine, dimethylethanolamine, dimethylisopropanolamine, and the salts of the cationic hydrophilicizing agents described.

It is preferred in a) to use hydrophilicizing agents of the aforementioned kind with carboxylic or sulfonic acid groups, and/or the corresponding acid anions.

Particularly preferred hydrophilicizing agents are 2-(2-aminoethylamino)ethanesulfonic acid, the adduct of IPDA and acrylic acid (EP-A 0 916 647, example 1), dimethylolpropionic acid and hydroxypivalic acid.

Suitable polyols b) are the hydroxy-functional compounds that are known per se in polyurethane chemistry, such as
b1) polyesters,
b2) low molecular weight compounds with molecular weights of 62 to 500 g/mol,
b3) polycarbonates,
b4) C2 polyethers and/or C3 polyethers, b5) C4 polyethers and also hydroxy-functional epoxides, polyolefins, addition polymers, castor oil, castor oils modified in respect of functionality and/or number of double bonds, hydrocarbon resins, formaldehyde condensation products and mixtures of the aforementioned compounds.

Concerning the molecular weights of b1), b3), b4) and b5) there are no restrictions; typically the molecular weights are 500 to 20000 g/mol, preferably 500 to 12000 g/mol.

The polyols b1) to b5) can be used individually or in any desired mixtures with one another, and also, if appropriate, in mixtures with further polyols as part of b).

Polyesters b1) typically have an average functionality of 1 to 4, preferably of 1.8 to 3 and more preferably of 2. In this context it is also possible to use mixtures of different polyesters and also mixtures of polyesters with different functionalities. The molecular weights of polyesters b1) are with particular preference in the range from 700 to 5000 g/mol.

Suitable polyesters b1) can be prepared by conventional methods with elimination of water at temperatures of 100 to 260° C., if appropriate with accompanying use of typical esterification catalysts such as para-toluenesulfonic acid, dibutyltin dilaurate, HCl, tin(II) chloride, etc., preferably according to the principle of a melt condensation or azeotropic condensation, if appropriate with a vacuum being applied or with an entraining gas being used, from mono-, di-, tri- and/or tetracarboxylic acids and/or their anhydrides, mono-, di-, tri- and/or tetrafunctional alcohols and, if appropriate, lactones. In the case of an azeotropic esterification the entraining agent, typically isooctane, xylene, toluene or cyclohexane, is distilled off under reduced pressure after the end of reaction. A preferred preparation process for the polyesters b1) is a melt condensation under reduced pressure.

Suitable acids as a polyester building block may be phthalic anhydride, isophthalic acid, terephthalic acid, adipic acid, sebacic acid, suberic acid, succinic acid, maleic anhydride, fumaric acid, dimer fatty acids, tetrahydrophthalic anhydride, hexahydrophthalic anhydride, cyclohexanedicarboxylic acid, trimellitic anhydride, C8-C22 fatty acids such as 2-ethylhexanoic acid, stearic acid, oleic acid, soya oil fatty acid, peanut oil fatty acid, other unsaturated fatty acids, hydrogenated fatty acids, benzoic acid, cyclohexanecarboxylic acid and mixtures of the stated acids and also, if appropriate, of other acids.

Suitable alcohols as a polyester building block are, for example, 1,2-ethylene glycol, diethylene glycol, triethylene glycol, tetraethylene glycol, 1,2-propylene glycol, dipropylene glycol, tripropylene glycol, 1,3-propanediol, 1,3-butanediol, 1,4-butanediol, 1,6-hexanediol, neopentyl glycol, 1,4-cyclohexanedimethanol, 1,4-cyclohexanediol, butenediol, butynediol, hydrogenated bisphenols, trimethylpentanediol, 1,8-octanediol and/or tricyclodecanedimethanol, trimethylolpropane, ethoxylated trimethylolpropane, propoxylated trimethylolpropane, propoxylated glycerol, ethoxylated glycerol, glycerol, pentaerythritol, castor oil, monofunctional alcohols such as, for example, cyclohexanol, 2-ethylhexanol, polyethylene oxides, polypropylene oxides, polyethylene/propylene oxide copolymers or block copolymers, and mixtures of these and/or other alcohols.

Another suitable polyester base material is caprolactone, which can be used proportionally or else as a major component for the preparation of the polyesters b1).

Preferred polyester base materials are adipic acid, phthalic anhydride, tetrahydrophthalic anhydride, isophthalic acid, terephthalic acid, glutaric acid, soya oil fatty acid, benzoic acid, 2-ethylhexanoic acid, 1,4-butanediol, neopentyl glycol, 1,2-propylene glycol, ethylene glycol, diethylene glycol, 1,6-hexanediol, trimethylolpropane, pentaerythritol, castor oil, glycerol and mixtures thereof.

Particular preference is given to polyesters based on dicarboxylic acids which to an extent of at least 60% by weight, more preferably to an extent of 100% by weight, are aromatic in nature, more particularly phthalic anhydride, isophthalic acid, terephthalic acid.

Suitable low molecular weight polyols b2) are, for example, short-chain—that is, containing 2 to 20 carbon atoms—aliphatic, araliphatic or cycloaliphatic diols or triols. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate, trimethylolethane, trimethylolpropane or glycerol.

Preferred low molecular weight polyols b2) are diethylene glycol, ethylene glycol, butanediol dipropylene glycol, 1,2-propanediol, neopentyl glycol, trimethylpentanediol, cyclohexanediol, 1,2 and 1,4-cyclohexanedimethanol, trimethylolpropane and glycerol.

Suitable polyols b3) are hydroxyl-terminated polycarbonates which are obtainable by reacting diols or else lactone-modified diols or else bisphenols, such as bisphenol A, for example, with phosgene or carbonic diesters such as diphenyl carbonate or dimethyl carbonate. By way of example, mention may be made of the polymeric carbonates of 1,6-hexanediol, of 1,4-butanediol, of TCD-diol, of 1,4-cyclohexanedimethanol, of 3-methyl-1,5-pentanediol, of pentanediol, of dimerdiol, of dodecanediol, of triethylene glycol, of poly-THF 650 and/or mixtures thereof, and also of the carbonates of reaction products of the stated diols with 6-caprolactone in a molar ratio of 1 to 0.1.

Preference is given to aforementioned polycarbonate diols with a number-average molecular weight of 600 to 3000 g/mol and to carbonates of reaction products of 1,6-hexane diol with ε-caprolactone in a molar ratio of 1 to 0.33.

C2 and/or C3 polyethers suitable as polyol b4) are oligomeric and polymeric reaction products of ethylene oxide and/or in the form of homopolymers, copolymers or else block (co)polymers.

The number-average molecular weights are situated preferably in the range from 500 to 6000 g/mol. The functionality of the polyethers is typically 1 to 4, preferably 2 to 3 and more preferably 2.

Suitable starter molecules or a starter molecular mixture are the known alcohols, amino alcohols and amines of the prior art, as described in Ullmanns Encyklopädie der technischen Chemie, Volume 19, 4 edition, Verlag Chemie GmbH, Weinheim, 1980, p. 31 ff.

C4 polyethers suitable as polyol b5) are oligomeric and polymeric reaction products of tetrahydrofuran in the form of homopolymers, possibly also copolymers or block (co)polymers with other monomers.

The number-average molecular weights are situated preferably in the range from 800 to 4000 g/mol. The functionality of the polyethers is typically 1 to 4, preferably 2 to 3 and more preferably 2.

Suitable starter molecules or a starter molecular mixture are, for example, the known alcohols, amino alcohols and amines of the prior art, as described for example in Ullmanns Encyklopädie der technischen Chemie, Volume 19, 4 edition, Verlag Chemie GmbH, Weinheim, 1980, p. 31 ff.

Preferred polyethers b4) and b5) are difunctional polyethers based on propylene oxide and/or tetrahydrofuran, with number-average molecular weights of 1000 to 2000 g/mol.

As further polyols it is possible to use hydroxyl-terminated polyamide alcohols, hydroxyl-terminated polyolefins based on ethylene, propylene, isoprene and/or butadiene, and hydroxyl-terminated polyacrylate diols, e.g. Tegomer® BD 1000 (Tego GmbH, Essen, DE).

Also particularly preferred is the use of a mixture of a defined polyol b2) of low molecular weight and one or two oligomeric and/or polymeric polyols based on polyester, polycarbonate and/or C3 and/or C4 polyether.

The compounds of component b) are used in the process of the invention typically in amounts of 3% to 75%, preferably 8% to 69% and more preferably 10% to 60% by weight, based on the hydroxy-functional polyurethanes containing urea groups.

Suitable components c) are any desired organic compounds which have at least two free isocyanate groups per molecule.

Suitability is possessed by diisocyantes of the general formula $X(NCO)_2$, where X is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms.

Examples of diisocyanates of this kind are tetramethylene diisocyanate methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 2,2-bis(4-isocyanatocyclohexyl)propane, 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, p-xylylene diisocyanate, p-isopropylidene diisocyanate, and mixtures of these compounds.

Likewise possible is the use of monomeric triisocyanates such as 4-isocyanatomethyl-1,8-octane diisocyanate (nonane triisocyanate).

Also suitable as well as the aforementioned monomeric isocyanates are the higher molecular weight derivatives of these monomeric isocyanates that are known per se, having uretdione, isocyanurate, urethane, allophanate, biuret, carbodiimide, iminooxadiazinedione and/or oxadiazinetrione structure, as are obtainable in a conventional manner through modification of simple aliphatic, cycloaliphatic, araliphatic and/or aromatic diisocyanates.

The polyisocyanates used in c) are based preferably on hexamethylene diisocyanate, isophorone diisocyanate, 4,4'-diisocyanatodicyclohexylmethane, 1-methyl-2,4-diisocyanatocyclohexane, 1-methyl-2,6-diisocyanatocyclohexane, 2,4-diisocyanatotoluene and/or 2,6-diisocyanatotoluene.

In c) it is particular preferred to use a polyisocyanate component which comprises at least one polyisocyanate having on average more than two isocyanate groups and which may further comprise monomeric diisocyanates.

Preferred components among these polyisocyanate components c) are those composed of c1) 0% to 95% by weight of at least one difunctional isocyanate from the group consisting of hexamethylene diisocyanate, isophorone diisocyanate, 4,4'-diisocyanatodicyclohexylmethane, 1-methyl-2,4-diisocyanatocyclohexane, 1-methyl-2,6-diisocyanatocyclohexane, 2,4-diisocyanatotoluene and/or 2,6-diisocyanatotoluene and c2) 5% to 100% by weight of at least one polyisocyanate having on average more than two isocyanate groups with uretdione, biuret, isocyanurate, allophanate, carbodiimide, iminooxadiazinedione, oxadiazinetrione, urethane and/or urea structural units.

With particular preference the polyisocyanate component used in c) is composed of c1) 27% to 73% by weight of at least one difunctional isocyanate selected from the group consisting of hexamethylene diisocyanate, isophorone diisocyanate, 2,4-diisocyanatotoluene and/or 2,6-diisocyanatotoluene and 4,4'-diisocyanatodicyclohexylmethane and c2) 73% to 27% by weight of at least one polyisocyanate having on average more than two isocyanate groups with uretdione, biuret, isocyanurate, allophanate, carbodiimide, iminooxadiazinedione, oxadiazinetrione, urethane and/or urea structural units based on hexamethylene diisocyanate.

The compounds of component c) are used in the process of the invention typically in amounts of 19 to 70%, preferably 22% to 65% and more preferably 24% to 60%, by weight, based on the hydroxy-functional polyurethanes containing urea groups.

Suitable compounds of component d), where appropriate for accompanying use, may be as follows: further hydrophilic components such as mono- or dihydroxy-functional polyethers such as mono- and/or di-hydroxy-functional ethylene oxide polyethers, mono- and/or dihydroxy-functional propylene oxide/ethylene oxide copolyethers and/or mono- and/or dihydroxy-functional propylene oxide/ethylene oxide block polyethers of the molecular weight range 200 to 3000 g/mol, hydrazide compounds such as hydrazine or adipic dihydrazide, diamines such as ethylenediamine, 1,3-propylenediamine, 1,6-hexamethylenediamine, isophoronediamine, 1,3-, 1,4-phenylenediamine, 4,4'-diphenylmethanediamine, 4,4'-dicyclohexylmethanediamine, amino-functional polyethylene oxides or polypropylene oxides, which are obtainable under the name Jeffamin®, D series (Huntsman Corp. Europe, Belgium), and also triamines such as diethylenetriamine, monoamines, such as butylamine, ethylamine and amines of the Jeffamin® M series (Huntsman Corp. Europe, Belgium), amino-functional polyethylene oxides and polypropylene oxides; likewise suitable, albeit less preferably, are monofunctional alcohols as ethanol, propanol, isopropanol, butanol, sec-butanol, tert-butanol, pentanol, hexanol, octanol, butyl glycol, butyl diglycol methyl glycol, methyl diglycol, ethyl glycol, ethyl diglycol, methyl glycol, methoxy diglycol, methoxy triglycol, methoxypropanol cyclohexanol, 2-ethylhexanol; likewise suitable may be C9-C22 alcohols, which if appropriate may also contain double bonds, such as stearyl alcohol, oleyl alcohol; vinyl alcohol, hydroxyethyl (meth)acrylate, hydroxypropyl (meth)acrylate, hydroxybutyl (meth)acrylate; thiols and other NCO-reactive compounds, and mixtures of the exemplified components d) and of other compounds too.

If components d) are used, then it is preferably the polyether-based hydrophilic compounds exemplified above.

The compounds of component d) are used in amounts of typically 0% to 25%, preferably 0% to 10%, more preferably 0% to 3.5%, by weight, based on the hydroxy-functional polyurethanes containing urea groups.

Compounds of component e) that are suitable in principle are amino alcohols having exclusively one primary or exclusively one secondary amino group and at least one hydroxyl group, such as diethanolamine, N-methylethanolamine, N-ethylethanolamine, N-propylethanolamine, diisopropanolamine, N-methylisopropanolamine, N-ethylisopropanolamine, N-propylisopropanolamine, N-hydroxyethylaminocyclohexane, N-hydroxyethylaminobenzene, reaction products of monoepoxides such as, for example, Cardura® E10 [glycidyl ester of Versatic acid, Hexion] with primary or secondary monoamines such as ammonia, ethylamine, propylamine, butylamine, hexylamine, cyclohexylamine or amino alcohols having primary amino groups such as ethanolamine, isopropanolamine, propanolamine, reaction products of unsaturated compounds such as hydroxyethyl acrylate, hydroxypropyl acrylate, hydroxybutyl acrylate, hydroxyethyl methacrylate, hydroxypropyl methacrylate or hydroxybutyl methacrylate in the sense of a Michael addition with primary or secondary amines or with amino alcohols having primary amino groups such as ammonia, ethylamine, propylamine, butylamine, hexylamine, cyclohexylamine, ethanolamine, isopropanolamine, propanolamine, with component e) being composed to an extent of at least 60% by weight of amino alcohols having secondary amine groups.

In component e) it is preferred to use at least 80% by weight of amino alcohols having a secondary amino group and 1 to 3 hydroxyl groups.

With particular preference use is made in component e) exclusively, i.e. to an extent of 100% by weight, of amino alcohols having exclusively one secondary amino group and one or two hydroxyl groups, such as diethanolamine, N-methylethanolamine, N-ethylethanolamine, diisopropanolamine, N-methylisopropanolamine, N-ethyl isopropanolamine.

The compounds of component e) are used typically in amounts of 0.7% to 1.2%, preferably of 0.93% to 1.03% and more preferably in amounts of 0.96 to 1.0 equivalent of amino groups of the compounds of component e) to equivalents of isocyanate groups of the prepolymer, obtained by reacting components a), b), c) and, if appropriate, d), in order to obtain conversion of the amino groups with the isocyanate groups, to form urea structures, that is as targeted as possible.

The reaction of the NCO-functional intermediate formed from the components a), b), c) and, if appropriate, d) with the hydroxyamine component e), this reaction being essential to the invention, leads to the formation of urea structures.

For the preparation of the hydroxy-functional polyurethanes containing urea groups which are essential to the invention, and/or of their solutions, the constituents a), b), c) and, if appropriate, d) are reacted in a single-stage or, if appropriate, multi-stage synthesis, if appropriate with accompanying use of catalyst(s), to give an isocyanate-functional intermediate, followed by reaction with component e) until the desired isocyanate content has been reached, generally <0.5%, preferably <0.1%, by weight. In the case of the preparation of the solutions, this is followed by the dissolution of the hydroxy-functional polyurethanes containing urea groups in or with water, a sufficient amount of suitable neutralizing agent being added at any desired point in time before or parallel with the dissolution, and any solvent used being distilled off again in whole or in part.

The isocyanate-functional intermediate is prepared either in bulk at 20 to 170° C. or in organic solution at temperatures of 20 to 200, preferably 40 to 90° C. by reaction of components a), b), c) and, if appropriate, d) until the isocyanate content is at approximately, or just below, the theoretical or desired isocyanate content and this is followed by the reaction of this isocyanate-functional intermediate with component e), preferably such that component e), diluted if appropriate with a solvent, is introduced at 0 to 50° C. and the isocyanate-functional intermediate, in solution if appropriate, is metered in at a rate such that the exothermic reaction remains controllable at every point in time. The amount of component e) in this case is preferably such that one amino group of an amino alcohol is used for each free isocyanate group of the intermediate. The reaction is then carried out until the isocyanate content of the reaction product has reached the desired value, preferably <0.1%, more preferably 0%, by weight.

The neutralizing agents that are needed in order to convert the acid groups of the compounds of component a) may be used during the actual preparation of the isocyanate-functional intermediate, if the neutralizing agents do not contain isocyanate-functional groups. Suitable in principle for this purpose are all amines which contain no primary or secondary amino group and no hydroxyl group, such as triethylamine, N-methylmorpholine, dimethylcyclohexylamine, ethyldiisopropylamine, dimethylisopropylamine, and mixtures of these and of other corresponding amines as well.

If appropriate it is necessary to bear in mind that excessive amounts of such neutralizing agents may lead during the reaction to unwanted secondary reactions, such as an excessive trimerization of the compounds of component c). Therefore the neutralizing agents exemplified are preferably not added until after the preparation of the isocyanate-functional intermediate.

It is particularly preferred to add the neutralizing agents after the reaction of the isocyanate-functional intermediates with the amino alcohol component e), either before dissolution with/in water or in parallel thereto, as for example through the use of a water/neutralizing agent mixture for the dissolution step.

Here it is also possible, as well as the amines already stated, to use other bases, which contain, for example, free amino and/or hydroxyl groups, such as, for example, ammonia, 2-aminoethanol, aminopropanols, 3-amino-1,2-propanediol, aminobutanols, 1,3-diamino-2-propanol, bis(2-hydroxypropyl)amine, triethanolainine, N-methyldiethanolamine, N-methyldiisopropanolamine, dimethylethanolamine, diethylethanolamine, dimethylisopropanolamine, morpholine, 2-aminomethyl-2-methylpropanol and also sodium hydroxide, lithium hydroxide, barium hydroxide, potassium hydroxide and also mixtures of the stated neutralizing agents and also, if appropriate, of other neutralizing agents.

Preferred neutralizing agents are ammonia, triethylamine, dimethylethanolamine, methyldiethanolamine, triethanolamine, 2-aminomethyl-2-methylpropanol, dimethylcyclohexylamine, ethyldiisopropylamine, lithium hydroxide, sodium hydroxide, potassium hydroxide and mixtures thereof.

The amount of neutralizing agent added overall is such that an optically clear to slightly opaque aqueous solution is obtained. Typically the degree of neutralization, based on acid groups incorporated, is at least 25 mol %, preferably at least 50 mol % and not more than 150 mol %. With a degree of neutralization of more than 100 mol %, as well as 100% of ionic salt groups, there is also then additional free neutralizing agent present. Particular preference is given to a degree of neutralization of 50 to 100 mol %.

It is also possible to use mixtures and/or combinations of different neutralizing agents.

In the case of cationic aqueous polyurethane solutions, the tertiary amino groups incorporated are converted with acid into the corresponding salts. Suitable in principle for this purpose are all acids, preference being given to phosphoric acid, lactic acid and acetic acid.

Suitable catalysts for preparing the hydroxy-functional polyurethanes containing urea groups that are essential to the invention are, for example, the catalysts that are known in isocyanate chemistry, such as tertiary amines, compounds of tin, of zinc, of titanium, of zirconium, of molybdenum or of bismuth, especially triethylamine, 1,4-diazabicyclo[2,2,2]octane, tin dioctoate or dibutyltin dilaurate. The catalysts may be used in amounts of 0% to 2% by weight, preferably of 0% to 0.5% by weight, based on the total amount of all the compounds used for polyurethane preparation.

The dissolution in water of the hydroxyl-functional polyurethanes containing urea groups is accomplished either by addition of water, heated if appropriate, with stirring to the polyurethane, if appropriate in solution in organic solvents, or else by transfer of the polyurethane, containing organic solvents if appropriate, to an aqueous receiver vessel, with stirring.

Examples of suitable solvents are acetone, methyl ethyl ketone, methyl isobutyl ketone, Ne-methylpyrrolidone, N-ethylpyrrolidone, butyl glycol, butyl diglycol, ethylene glycol dimethyl ether, ethylene glycol, propylene glycol, dipropylene glycol, methoxypropanol, methoxypropyl acetate and mixtures of the stated solvents and of other solvents too. Proportionally it is also possible to use hydrophobic solvents as well, such as aliphatic and/or aromatic hydrocarbons and/or hydrocarbon mixtures such as solvent naphtha, toluene, etc. A preferred solvent used is acetone.

The aqueous polyurethane solutions of the invention contain typically less than 20% by weight, preferably less than 5% by weight, of organic solvents, dispersants and diluents. Particular preference is given to virtually solvent-free aqueous solutions, which generally then contain less than 1% by weight of solvent.

The organic solvents used for the preparation, especially the preferred acetone, are frequently unable to dissolve the polyurethanes of the invention. In general an intermediate is obtained which is a non-aqueous dispersion of the polyurethane of the invention in the organic medium, in particular in acetone. This has the advantage that the viscosity prior to the dispersing step is particularly low and the dispersion is made easier.

The preparation of the aqueous polyurethane solutions of the invention via a non-aqueous, organic dispersion, preferably in acetone, as an intermediate is a preferred preparation process for the aqueous polyurethanes of the invention and their solutions.

Following dissolution in/with water, the solvent, where present, is removed partly, preferably wholly, by distillation, as for example by application of a gentle vacuum or by blowing off with a stream of nitrogen. In this context it is also possible to remove excess water by distillation as well as to increase further the solids content of the solutions.

Before, during or after the dissolution step f) it is possible if desired to add additives, auxiliaries, solvents or, again, neutralizing agents, such as surface-active substances, emulsifiers, stabilizers, anti-settling agents, UV stabilizers, catalysts for the crosslinking reaction, photoinitiators, initiators, defoamers, antioxidants, anti-skinning agents, flow control assistants, thickeners and/or bactericides.

In this way, visually clear, or else, if appropriate, slightly opaque, aqueous solutions are obtained of hydroxy-functional polyurethanes containing urea groups, with high solids contents, little or no fractions of organic solvents, excellent stability to hydrolysis even on prolonged storage, dilution characteristics and processing characteristics like those of organically dissolved polymers, which for diverse possible applications are outstandingly suitable. On the basis of the high solids contents and the character of the solution it is possible, for example, in one operation to obtain films having a particularly high, defect-free, smooth and very even coat thickness in the case of coating materials or adhesives, since, in contrast to the use of dispersions, there is no need for coalescence of dispersion particles and the solids contents is higher than is usual in the case of dispersions.

The aqueous polyurethane solutions which are essential to the invention typically have solids contents of 30% to 80%, preferably 46% to 75% and more preferably 55% to 75%, by weight.

The hydroxy-functional polyurethanes containing urea groups which are essential to the invention, have polyurethane molecular weights, determined arithmetically in accordance with the formula below, of 750 to 30000 g/mol, preferably of 850 to 7500 g/mol and more preferably of 1000 to 3000 g/mol.

The molecular weight can be determined arithmetically in accordance with the following formula:

$MG$=mass of batch/(mol of isocyanates $c$)+mol of hydrophilicizing agents $a$)+mol of polyols $b$)+mol of amino alcohols $d$)+mol of other compounds $e$))−equivalents of isocyanate groups=g/mol.

The hydroxy-functional polyurethanes containing urea groups which are essential to the invention, and their solutions, preferably have hydroxyl group contents of 2.5% to 9% by weight more preferably 3% to 7.5% by weight, based on the polyurethane, it being possible for the OH groups to be primary and/or secondary in nature. Primary hydroxyl groups are preferred.

The acid number of the hydroxy-functional polyurethanes containing urea groups which are essential to the invention, and their solutions, is preferably 2 to 45 mg/KOH/g, preferably 4 to 28 mg KOH/g and more preferably 6 to 17 mg KOH/g, based on the polyurethane.

The hydroxy-functional polyurethanes containing urea groups which are essential to the invention, and their solutions, contain urea group contents, generated via the amino group of component e), of 3% to 20%, preferably 5% to 17% and very preferably 8% to 14% by weight, based on the polyurethanes; it is possible for further urea groups, as for example through the use of polyisocyanate components c) containing urea groups and/or through the use of amines as component d), and/or through the use of amino-functional hydrophilicizing agents a), to be incorporated into the aqueous solutions of the polyurethanes and/or into the polyurethanes themselves.

The solutions of the hydroxy-functional polyurethanes containing urea groups which are essential to the invention are aqueous solutions having an average particle size of <200 nm, preferably clear or opaque solutions having an average particle size of <50 nm, and more preferably optically clear solutions, for which in general it is no longer possible to determine particle sizes.

Suitable crosslinker resins of component B) are, for example, amide- and amine-formaldehyde resins, phenolic resins, aldehyde resins and ketone resins, such as phenol-formaldehyde resins, resoles, furan resins, urea resins, carbamic ester resins, triazine resins, melamine resins, benzoguanamine resins, cyanamide resins, aniline resins, as described by way of example in "Lackkunstharze", H. Wagner, H. F. Sarx, Carl Hanser Verlag Munich, 1971. Suitable water-dilutable and water-dispersible melamine-formaldehyde and urea-formaldehyde condensation products are described for example in D. H. Solomon, The Chemistry of Organic Filmformers, p. 235 ff, John Wiley Sons, Inc., New York 1967. Other crosslinking aminoplasts which may likewise be suitable are described in "Methoden der organischen Chemie" (Houben-Weyl), vol. 14/2, part 2, 4th edition, Georg Thieme Verlag, Stuttgart, 1963, p. 319 ff. A comprehensive description of amino and amide crosslinker resins that are suitable in principle, and also an overview of suppliers and product names, are given by D. Stoye, W. Freitag in "Lackharze, Chemie, Eigenschaften und Anwendungen", Carl Hanser Verlag Munich Wien, 1996, p. 104 ff.

One preferred embodiment uses exclusively at least one amino and/or urea crosslinker resin.

Likewise highly suitable crosslinker resins of component B) are blocked polyisocyanates, based for example on hexamethylene diisocyanate, bis(4-isocyanatocyclohexane) methane, 1,3-diisocyanatobenzene, tetramethylene diisocyanate, methylpentamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 2,2-bis(4-isocyanatocyclohexyl)propane, 1,4-diisocyanatobenzene, 1-methyl-2,4-diisocyanatocyclohexane, 1-methyl-2,6-diisocyanatocyclohexane, 2,4-diisocyanatotoluene, 2,6-diisocyanatotoluene, 4,4'-diisocyanato-diphenylmethane, 2,2'- and 2,4'-diisocyanatodiphenylmethane, p-xylylene diisocyanate, p-isopropylidene diisocyanate, 4-isocyanatomethyl-1,8-octane diisocyanate, p-xylylene diisocyanate and α,α,α',α'-tetramethyl-m- or p-xylylene diisocyanate, and also mixtures composed of these and also other isocyanate compounds.

It is of course also possible, and as a general rule also advantageous, to use, on the basis of the exemplified polyisocyanates, the polyisocyanates of high functionality that are known per se in polyurethane chemistry and have uretdione, carbodiimide, allophanate, isocyanurate, urethane, iminooxadiazinedione, oxadiazinetrione and/or biuret groups, as blocked crosslinker resins in component B).

Suitable blocking agents for the polyisocyanate crosslinkers may be as follows: monoalcohols such as methanol, ethanol, butanol, hexanol, benzyl alcohol, oximes such as acetoxime, methyl ethyl ketoxime, lactams such as caprolactam, phenols, CH-acidic compounds such as acetoacetic esters or malonic esters such as diethyl malonate, dimethylpyrazole, amines such as tert-butylbenzylamine, triazole, dimethyltriazole, dicyclohexylamine, diisopropylamine. It is also possible to use mixtures of the stated blocking agents and also of other blocking agents.

Preferred blocking agents are dimethylpyrazole, butanone oxime, caprolactam, malonic esters, tert-butylbenzylamine, triazole, and mixtures of the said blocking agents, where appropriate with further blocking agents as well.

With particular preference the blocking agent is composed to an extent of at least 50% of dimethylpyrazole.

In one preferred embodiment at least one crosslinker resin containing blocked NCO groups is used exclusively.

The polyisocyanate crosslinkers B) containing blocked isocyanate groups may, in addition to other synthesis components such as diols, triols, polyester polyols, polyether polyols, polycarbonate polyols and diamines, for example, also comprise hydrophilicizing components, examples being the nonionic type specified under the description of hydrophilicizing component d), and based on mono- or dihydroxy-functional polyethers such as mono- and/or dihydroxy-functional ethylene oxide polyethers, mono- and/or dihydroxy-functional propylene oxide/ethylene oxide copolyethers and/or mono- and/or dihydroxy-functional propylene oxide/ethylene oxide block polyethers of the molecular weight range 200 to 3000 g/mol, and/or ionic hydrophilicizing agents having at least one isocyanate-reactive group, such as primary or secondary amino groups and/or hydroxyl groups, for example, and also at least one acid group such as carboxyl or sulphonic acid group, for example, and/or their salts as formed by addition of neutralizing agents.

Likewise suitable are the ionic hydrophilicizing agents already mentioned under a), such as mono- and dihydroxy-carboxylic acids, mono- and diaminocarboxylic acids, mono- and dihydroxysulphonic acids, mono- and diaminosulphonic acids as well as mono- and dihydroxyphosphonic acids or mono- and diaminophosphonic acids and their salts, such as dimethylolpropionic acid, dimethylolbutyric acid, dimethylolacetic acid, 2,2-dimethylpentanoic acid, dihydroxysuccinic acid, hydroxypivalic acid, N-(2-aminoethyl) alanine, 2-(2-aminoethylamino)ethanesulphonic acid, ethylenediaminepropyl- or -butylsulphonic acid, 1,2- or 1,3-propylenediammethylsulphonic acid, malic acid, citric acid, glycolic acid, lactic acid, glycine, alanine, taurine, lysine, 3,5-diaminobenzoic acid, 6-aminohexanoic acid, 11-aminoundecanoic acid, aminoacetic acid, an adduct of IPDI hexamethylenediamine or another diamine and acrylic acid (EP-A 0 916 647, example 1) and its alkali metal and/or ammonium salts; the adduct of sodium bisulphite with but-2-ene-1,4-diol, polyethersulphonate, the propoxylated adduct of 2-butenediol and $NaHSO_3$, described for example in DE-A 2 446 440 (page 5-9, formula I-II) and/or the salts of the hydrophilicizing agents described, and mixtures of the hydrophilicizing agents mentioned and, where appropriate, other hydrophilicizing agents.

Preferred ionic or potential ionic compounds are those which possess carboxy or carboxylate and/or sulphonate groups.

Particularly preferred hydrophilicizing agents are 2-(2-aminoethylamino)ethanesulphonic acid, the adduct of IPDA and acrylic acid (EP-A 0 916 647, Example 1), dimethylolpropionic acid and hydroxypivalic acid.

The free acid groups represent "potentially ionic" groups, while the salt-like groups obtained by neutralization with neutralizing agents, carboxylate groups and/or sulphonate groups, are ionic groups.

The polyisocyanate crosslinkers mentioned above which are suitable for B) have an NCO content of 1% to 50% by weight, preferably of 8% to 30% by weight based on the solids content. They may where appropriate be diluted with a solvent which is miscible with water if appropriate but that is inert towards isocyanates.

It is also possible to combine different kinds of crosslinkers B), such as an amino crosslinker resin with a blocked polyisocyanate, for example, or two or more diisocyanates and/or polyisocyanates, which where appropriate may be hydrophilicized. Likewise possible are other combinations of the exemplified crosslinkers, where appropriate also with other crosslinkers such as, for example, with polyisocyanate crosslinkers having free isocyanate groups.

The crosslinkers B) are sufficiently stable on storage in combination with the polyurethanes essential to the invention and/or their solutions of component A), at room temperature and slightly elevated temperature (e.g. up to 50° C.), and, following application, they react at elevated temperature (>70° C., preferably >90° C.), following elimination of the blocking agents, with reaction of the isocyanate groups that are then released with the hydroxyl groups, to form, for example, crosslinked coatings. The crosslinking density can be controlled within wide limits by specifying the amount of reactive groups. Over crosslinking by addition of excess amounts of crosslinker is just as possible as under crosslinking through the use of deficit amounts of crosslinker. Hence it is possible to exert influence over special effects that are familiar to the skilled person, in respect for example of adhesion, hardness, resistance of the coating.

If the amounts of hydrophilic groups sufficient for dispersing and/or for dissolving in water are present in the crosslinkers B), then components A) and B) can be mixed with one another at any desired points in time, where appropriate with addition of water. In that case an effect of component A) for the crosslinker B) that assists dispersing or dissolving is unnecessary.

If the crosslinker component B) has few hydrophilic groups or none at all, then either B) preparation takes place in situ in the presence of component A)—prior to the dispersing in water of the hydroxy-functional polyurethanes that contain urea groups and are essential to the invention, or component A) is mixed into the hydroxy-functional polyurethanes containing urea groups that are essential to the invention, so that an effect allowing dispersing or dissolving, respectively, is exerted on the crosslinker B).

In component C) dispersions may also be used which contain unsaturated groups, such as dispersions containing unsaturated polymerizable groups and based on polyester, polyurethane, polyepoxide, polyether, polyamide, polysiloxane, polycarbonate, epoxy acrylate, addition polymer, polyester acrylate, polyurethane-polyacrylate and/or polyacrylate.

It is also possible for dispersions based, for example, on polyesters, polyurethanes, polyepoxides, polyethers, polyamides, polyvinyl esters, polyvinyl ethers, polysiloxanes, polycarbonates, addition polymers and/or polyacrylates to be admixed that likewise contain functional groups such as hydroxyl groups, for example. Therefore it is possible for example to combine two different hydroxy-functional aqueous polymers, for example to combine the relatively low molecular weight aqueous polyurethane solutions of the invention, having relatively high hydroxyl group contents, with relatively high molecular weight polymer dispersions based, for example, on polyacrylate and/or polyurethane and having relatively low hydroxyl group contents, and so to generate special effects, examples being segmentation, interpenetrating networks, etc.

It is also possible to admix dispersions which are based on polyesters, polyurethanes, polyepoxides, polyethers, polyamides, polysiloxanes, polyvinyl ethers, polybutadienes, polyisoprenes, chlorinated rubbers, polycarbonates, polyvinyl esters, polyvinyl chlorides, addition polymers, polyacrylates, polyurethane-polyacrylate, polyester acrylate, polyether acrylate, alkyd, polycarbonate, polyepoxide, epoxy acrylate and that contain no functional groups. In this way it is possible, for example, to reduce the degree of the crosslinking density, to influence the physical drying, such as to accelerate it, for example, or to bring about elasticization or an adaptation of adhesion.

It is also possible to prepare mixtures of the polyurethane solutions that are essential to the invention with other dispersions and to use such mixtures, containing more than one of the dispersions exemplified above.

Likewise in combinations with the dispersions of the invention what are called reactive diluents, low-viscosity compounds with unsaturated groups, such as for example hexanediol bisacrylate, trimethylolpropane trisacrylate, trimethylolpropane diacrylate, pentaerythritol tetraacrylate, dipentaerythritol hexaacrylate, and diepoxide bisacrylate based on bisphenol A may be suitable.

The PU systems of the invention are suitable in principle for coating, painting, treating and sealing any of a very wide variety of substrates, especially metals, wood, ceramic, stone, concrete, bitumen, hard fibre, glass, porcelain, plastics, leather and/or textiles of any of a very wide variety of kinds. They are of benefit in or as paints, coating materials, sealants, liquid inks, printing inks, sizes, adhesion promoters and reactive diluents.

In this way coating materials and coatings are preferably obtained which are distinguished by very good processing properties, robustness and also freeze stability and are distinguished to coatings having excellent film optical qualities and evenness, low susceptibility to craters, good resistance properties, and a balanced hardness/elasticity level.

The polyurethane systems of the invention are produced by mixing the components A) to C). This mixing operation may take place in one stage or in a multiplicity of stages, by stirring by hand or else by using technical assistants or machines which generate an increased shearing action and so produce particularly homogeneous mixing. Suitable mixing methods and mixing assemblies are, for example, nozzle-jet dispersing, dispersing by means of dissolvers, by means of forced mixing assemblies, by means of ball mills or bead mills, or by means of static mixers, etc.

In order to obtain particular effects it is also possible during production of the aqueous solutions or binder combinations of the invention to add the required amounts of auxiliaries that are typical, for example, in the coatings industry, such as, for example, surface-active substances, emulsifiers, stabilizers, anti-settling agents, UV stabilizers, slip additives, matting agents, catalysts for the crosslinking reaction, defoamers, antioxidants, anti-settling agents, wetting agents, plasticizers, anti-skinning agents, flow control assistants, thickeners and/or bactericides.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The stated viscosities were measured in accordance with DIN 53229 at 23° C.

The stated NCO contents were determined in accordance with DIN EN ISO 11909.

The stated solids contents were determined in accordance with DIN EN ISO 3251.

Raw materials used:

Desmophen® C 2200 (Bayer MaterialScience AG, Leverkusen, Germany), aliphatic polycarbonate diol with hydroxyl end groups, molecular weight 2000 g/mol, OH number 56 mg KOH/g solids Desmodur® N 3300 (Bayer Material Science AG, Leverkusen, Germany), solvent-free aliphatic polyisocyanate with isocyanurate structural units, based on hexamethylene diisocyanate, equivalent weight 195 g/mol Desmodur® N 100 (Bayer MaterialScience AG, Leverkusen, Germany), solvent-free aliphatic polyisocyanate with biuret structural units, based on hexamethylene diisocyanate, equivalent weight 190 g/mol Desmophen® 2028 (Bayer MaterialScience AG, Leverkusen, Germany), polyester diol based on adipic acid, 1,6-hexanediol and neopentyl glycol, with hydroxyl end groups, molecular weight 2000, OH number 56 mg KOH/g solids Polyester P200H (Bayer MaterialScience AG, Leverkusen, Germany); polyester diol based on phthalic anhydride and 1,6-hexanediol, with hydroxyl end groups, molecular weight 2000 g/mol, OH number 56 mg KOH/G solids Polyester P200A (Bayer MaterialScience AG, Leverkusen, Germany); polyester diol based on phthalic anhydride and ethylene glycol, with hydroxyl end groups, molecular weight 2000 g/mol, OH number 56 mg KOH/G solids Polyester PE400HN (Bayer MaterialScience AG, Leverkusen, Germany), polyester diol based on adipic acid, 1,6-hexanediol and neopentyl glycol, with hydroxyl end groups, molecular weight 4000 g/mol, OH number 28 mg KOH/g solids MPEG 750: Methoxypolyethylene glycol, molecular weight 750 g/mol (e.g. Pluriol® 750, BASF AG, Germany)

Desmophen® 3600 (Bayer MaterialScience AG, Leverkusen, Germany); polypropylene oxide diol, with hydroxyl end groups, molecular weight 2000 g/mol, OH number 56 mg/KOH/g solids)

Polyurethane Solution 1)

A mixture of 8.5 g of butanediol, 270 g of polyester P200H and 41.6 g of dimethylolpropionic acid was diluted with 349 g of acetone and admixed at 40° C. with a mixture of 179.8 g of isophorone diisocyanate and 315.9 g of Desmodur® N 3300. It was stirred at 60° C. until the theoretical NCO content reached, or fell slightly below, 7.8%. This isocyanate-functional intermediate solution was diluted with 320 g of acetone and then incorporated with stirring into an initial charge mixture, introduced at room temperature, of 162 g of N-methylethanolamine and 148 g of acetone, the resulting mixture being stirred at 50° C. until the NCO content was <0.1%. This gave an acetonic solution of a hydroxy-functional polyurethane. Following the addition of 24.9 g of dimethylethanolamine as neutralizing agent, the product was dispersed by addition of 600 g of demineralized water, and the acetone was removed by distillation.

This gave a clear, aqueous, hydroxy-functional polyurethane solution having a urea group content of 12.6% by weight, a hydroxyl group content of 3.8% by weight (based in each case on solids content), a solids content of 65% by weight and a viscosity of 12000 mPas. The aqueous polyurethane solution was virtually solvent-free, with a pH of 7.1.

Polyurethane Solution 2)

A mixture of 368 g of polyester PE400HN and 35.4 g of dimethylolpropionic acid was diluted with 354 g of acetone and admixed at 40° C. with a mixture of 153 g of isophorone diisocyanate and 269 g of Desmodur® N 3300. It was stirred at 60° C. until the theoretical NCO content reached 7.3%. This isocyanate-functional intermediate solution was diluted with 321 g of acetone and then incorporated with stirring into an initial charge mixture, introduced at room temperature, of 65.2 g of diethanolamine, 91.4 g of N-methylethanolamine and 150 g of acetone, the resulting mixture being stirred at 50° C. until the NCO content=0. This gave an acetonic dispersion of a hydroxy-functional polyurethane. Following the addition of 21.2 g of dimethylethanolamine as neutralizing agent the product was dispersed by addition of 1000 g of demineralized water, and the acetone was then removed by distillation.

This gave a clear, aqueous, hydroxy-functional polyurethane solution having a urea group content of 10.7% by weight, a hydroxyl group content of 4.3% by weight (based in each case on solids content), a solids content of 53% by weight and a viscosity of 2500 mPas. The clear aqueous polyurethane solution was virtually solvent-free, with a pH of 6.8.

Polyurethane Solution 3)

A mixture of 8.4 g of neopentyl glycol, 300 g of Desmophen® 2028, 13.5 g of MPEG 750 and 48.2 g of dimethylolpropionic acid was diluted with 389 g of acetone and admixed at 40° C. with a mixture of 199.8 g of isophorone diisocyanate and 305.4 g of Desmodur® N 3300. It was stirred at 60° C. until the theoretical NCO content reached 7.7%. This isocyanate-functional prepolymer solution was diluted with 340 g of acetone and then incorporated with stirring into an initial charge mixture, introduced at room temperature, of 252 g of diethanolamine and 165 g of acetone, the resulting mixture being stirred at 50° C. until the NCO content was=0. This gave an acetonic, turbid-white dispersion of a hydroxy-functional polyurethane. Following the addition of 30.4 g of dimethylethanolamine as neutralizing agent, the product was dispersed by addition of 650 g of demineralized water, and the acetone was then removed by distillation.

This gave a clear, aqueous, hydroxy-functional polyurethane solution having a urea group content of 11.4% by weight, a hydroxyl group content of 7.0% by weight (based in each case on solids content), a solids content of 63% by weight and a viscosity of 3000 mPas. The aqueous polyurethane solution was clear, colourless and virtually solvent-free, with a pH of 7.4.

Polyurethane Solution 4)

A mixture of 7.5 g of neopentyl glycol, 190 g of Desmophen® 2028, 67 g of polyester P200H and 37 g of dimethylolpropionic acid was diluted with 321 g of acetone and admixed at 40° C. with a mixture of 159.8 g of isophorone diisocyanate, 281 g of Desmodur® N 3300. It was stirred at 60° C. until the theoretical NCO content reached 7.8%. This isocyanate-functional prepolymer solution was diluted with 292 g of acetone and then incorporated with stirring into an initial charge mixture, introduced at room temperature, of 50.4 g of diethanolamine, 108 g of N-methylethanolamine and 136 g of acetone, the resulting mixture being stirred at 50° C. until the NCO content was=0. This gave a bluish acetonic dispersion of a hydroxy-functional polyurethane. Following the addition of 22.1 g of dimethylethanolamine as neutralizing agent, the product was dispersed by addition of 575 g of demineralized water, and the acetone was then removed by distillation.

This gave a clear, aqueous, hydroxy-functional polyurethane solution having a urea group content of 12% by weight, a hydroxyl group content of 4.5% by weight (based in each case on solids content), a solids content of 60% by weight and a viscosity of 4200 mPas. The clear aqueous polyurethane solution was virtually solvent-free, with a pH of 7.0.

Polyurethane Solution 5)
Comparison: Use of a Triol (Trimethylolpropane) Instead of an Amino Alcohol with Secondary Amino Group as Component e)

A mixture of 7.4 g of butanediol, 275 g of Desmophen® 2028 and 40.3 g of dimethylolpropionic acid was diluted with 339 g of acetone and admixed at 40° C. with a mixture of 169.8 g of isophorone diisocyanate and 298.4 g of Desmodur® N 3300. It was stirred at 60° C. until the theoretical NCO content reached 7.6%. This isocyanate-functional prepolymer solution was diluted with 144 g of acetone and then incorporated with stirring into an initial charge mixture, introduced at room temperature, of 273 g of trimethylolpropane and 308 g of acetone, the resulting mixture being stirred at 50° C. until the NCO content was=0. About 3 hours after the start of this reaction, the batch gets.

By using a triol as component e) instead of an amino alcohol with secondary amino group it was not possible by this route to prepare aqueous hydroxy-functional polyurethane solutions.

Polyurethane Solution 6)
Comparison: Use of an Amino Alcohol with Primary Amino Group Instead of an Amino Alcohol with Secondary Amino Group as Component e)

A mixture of 8.7 g of butanediol, 275 g of Desmophen® C2200 and 42.4 of dimethylolpropionic acid was diluted with 356 g of acetone and admixed at 40° C. with a mixture of 183.2 g of isophorone diisocyanate and 321.8 g of Desmodur® N 3300. It was stirred at 60° C. until the theoretical NCO content reached 7.8% or slightly below. This isocyanate-functional prepolymer solution was diluted with 323 g of acetone and then incorporated with stirring into an initial charge mixture, introduced at room temperature, of 136.6 g of ethanolamine and 154 g of acetone, the resulting mixture being stirred at 50° C. until the NCO content was=0. This gave an acetonic dispersion of a hydroxy-functional polyurethane. Following addition of 25.3 g of dimethylethanolamine as neutralizing agent, the batch was dispersed by addition of 575 g of demineralized water, and the acetone was then removed by distillation.

This gave a clear, aqueous, hydroxy-functional polyurethane solution having an extremely high viscosity, which must be diluted by addition of a further 1050 g of water in order to be fluid at room temperature. The brown-coloured, aqueous polyurethane solution thus prepared has a solids content of only 35% by weight, a viscosity of 8500 mPas and a hydroxyl group content of 3.8% by weight (based in each case on solids content).

This comparative experiment shows the disadvantages of the use of an amino alcohol e) with primary amino groups instead of the preferred amino alcohols with secondary amino groups. Aqueous solutions are obtained which have a very low solids content and severe discoloration.

Polyurethane Solution 7)
Comparison: Use of a Triamine Instead of an Amino Alcohol with Secondary Amino Group as Component e)

A mixture of 8.8 g of butanediol, 260 g of Desmophen® C2200 and 39.2 g of dimethylolpropionic acid was diluted with 336 g of acetone and admixed at 40° C. with a mixture of 173.2 g of isophorone diisocyanate and 304.2 g of Desmodur® N 3300. It was stirred at 60° C. until the theoretical NCO content reached 7.8%. This isocyanate-functional prepolymer solution was diluted with 306 g of acetone and then incorporated with stirring into an initial charge mixture, introduced at room temperature, of 209 g of diethylenetriamine and 143 g of acetone, at which point there is, immediately, copious precipitation and strong cross-linking reactions.

This comparative experiment shows that it was not possible to prepare corresponding aqueous polyurethane solutions by using a triamine instead of an amino alcohol component e) with a secondary amino group.

Polyurethane Solution 8)
Comparison: Use of a Diol (Propylene Glycol) Instead of an Amino Alcohol with Secondary Amino Group as Component d)

A mixture of 3.9 g of butanediol and 346.8 of Desmophen® 2028 and 39.3 g of dimethylolpropionic acid was diluted with 368 g of acetone and admixed at 40° C. with a mixture of 169.8 g of isophorone diisocyanate and 298.4 g of Desmodur® N 3300. This mixture was stirred at 60° C. until the theoretical NCO content of 7.0% was reached. This isocyanate-functional prepolymer solution was diluted with 334 g of acetone and then introduced with stirring into an initial charge mixture, introduced at room temperature, of 155 g of 1,2-propylene glycol and 156 g of acetone, the resulting mixture was stirred at 50° C. until the NCO content=0. This gave an acetonic solution of a hydroxy-functional polyurethane. Following addition of 23.5 g of triethylamine as neutralizing agent, dispersion was carried out by addition of a total of 2200 g of demineralized water, and the acetone was then removed by distillation.

This gave a turbid, aqueous, hydroxy-functional polyurethane dispersion, with a very large number of gel particles, having a hydroxyl group content of 3.4% by weight (based on solids content), a solids content of only 32% by weight and a viscosity of 5000 mPas.

This comparative experiment shows that it was not possible to prepare corresponding, clear, homogeneous aqueous polyurethane solutions containing no gel particles and having high solids contents by using a diol with a primary and a secondary hydroxyl group instead of an amino alcohol component e) with a secondary amine group.

Polyurethane Solution 9)

A mixture of 6.7 g of neopentyl glycol, 118.8 g of Desmophen® 2028 118.8 g of polyester P200H and 38.2 g of dimethylolpropionic acid was diluted with 308 g of acetone and admixed at 40° C. with a mixture of 138.2 g of isophorone diisocyanate, 15.1 g of hexamethylene diisocyanate and 278 g of Desmodur® N 3300. It was stirred at 60° C. until the theoretical NCO content reached 7.7%. This isocyanate-functional prepolymer solution was diluted with 269 g of acetone and then incorporated with stirring into an initial charge mixture, introduced at room temperature, of 252.7 g of diisopropanolamine and 130 g of acetone, the resulting mixture being stirred at 50° C. until the NCO content was ~0. This give a bluish acetonic dispersion of the hydroxy-functional polyurethane. Following the addition of 24.1 g of triethylamine as neutralizing agent, the product was dispersed by addition of 520 g of demineralized water, and the acetone was then removed by distillation.

This gave an optically clear, aqueous, hydroxy-functional polyurethane solution having a urea group content of 10.8% by weight and a hydroxyl group content of 6.6% by weight (based in each case on solids content). The polyurethane solution may turn cloudy on storage; however, this was reversible and can be eliminated again by gentle heating, for example. The polyurethane solution has a solids content of 64% by weight, a viscosity of 12000 mPas, and was colourless and virtually solvent-free, with a pH of 7.6.

Polyurethane Solution 10)

A mixture of 66.3 g of neopentyl glycol and 28.5 g of dimethylolpropionic acid was diluted with 315 g of acetone and admixed at 40° C. with a mixture of 142.8 g of hexamethylene diisocyanate and 497 g of Desmodur® N 3300. It was stirred at 60° C. until the theoretical NCO content reached 10.2%. This isocyanate-functional prepolymer solution was diluted with 286 g of acetone and then incorporated with stirring into an initial charge mixture, introduced at room temperature, of 268 g of diethanolamine, and 134 g of acetone, the resulting mixture being stirred at 50° C. until the NCO content was=0. This gave a relatively coarse, acetonic dispersion of the hydroxy-functional polyurethane. Following the addition of 3.3 g of ammonia as neutralizing agent, the product was dispersed by addition of 520 g of demineralized water, and the acetone was then removed by distillation.

This gave an optically clear, aqueous, hydroxy-functional polyurethane solution having a urea group content of 14.5% by weight, a hydroxyl group content of 8.6% by weight (based in each case on solids content), a solids content of 67% by weight and a viscosity of 13000 mPas. The aqueous polyurethane solution was colourless and virtually solvent-free, with a pH of 7.1.

Polyurethane Solution 11)

A mixture of 270 g of polyester P200A, 8.5 g of butanediol and 41.6 g of dimethylolpropionic acid was diluted with 350 g of acetone and admixed at 40° C. with a mixture of 179.8 of isophorone diisocyanate and 316 g of Desmodur® N 3300. It was stirred at 60° C. until the theoretical NCO content reached 7.8%. This isocyanate-functional prepolymer solution was diluted with 318 g of acetone and then incorporated with stirring into an initial charge mixture, introduced at room temperature, of 162 g of N-methylethanolamine, and 150 g of acetone, the resulting mixture being stirred at 50° C. until the NCO content was=0. This gave a turbid, acetonic dispersion of the hydroxy-functional polyurethane. Following the addition of 24.9 g of dimethylethanolamine as neutralizing agent, the product was dispersed by addition of 750 g of demineralized water, and the acetone was then removed by distillation.

This gave an optically clear, aqueous, hydroxy-functional polyurethane solution having a urea group content of 12.3% by weight, a hydroxyl group content of 3.8% by weight (based in each case on solids content), a solids content of 57% by weight and a viscosity of 7000 mPas. The aqueous polyurethane solution was colourless and virtually solvent-free, with a pH of 8.9.

Polyurethane Solution 12)

A mixture of 500 g of polyester P200A and 33.5 g of dimethylolpropionic acid was diluted with 375 g of acetone and admixed at 40° C. with a mixture of 180.4 of isophorone diisocyanate and 161 g of Desmodur® N 3300. It was stirred at 60° C. until the theoretical NCO content reached 4.9%. This isocyanate-functional prepolymer solution was diluted with 340 g of acetone and then incorporated with stirring into an initial charge mixture, introduced at room temperature, of 109 g of N-methylethanolamine, and 159 g of acetone, the resulting mixture being stirred at 50° C. until the NCO content was=0. This gave an acetonic dispersion of the hydroxy-functional polyurethane. Following the addition of 19.3 g of triethylamine as neutralizing agent, the product was dispersed by addition of 900 g of demineralized water, and the acetone was then removed by distillation.

This gave an optically clear, aqueous, hydroxy-functional polyurethane solution having a urea group content of 8.2% by weight, a hydroxyl group content of 2.5% by weight (based in each case on solids content), a solids content of 50% by weight and a viscosity of 1500 mPas. The aqueous polyurethane solution was colourless and virtually solvent-free, with a pH of 6.6.

Polyurethane Solution 13)

A mixture of 8.7 g of butanediol, 195 g of Desmophen® C2200, 80 g of Desmophen® 3600 and 42.4 g of dimethylolpropionic acid was diluted with 353 g of acetone and admixed at 40° C. with a mixture of 183.2 g of isophorone diisocyanate and 315.2 g of Desmodur® N 100. It was stirred at 60° C. until the theoretical NCO content reached, or fell slightly below, 7.8%. This isocyanate-functional intermediate solution was diluted with 320 g of acetone and then incorporated with stirring into an initial charge mixture, introduced at room temperature, of 165 g of N-methylethanolamine and 149 g of acetone, the resulting mixture being stirred at 50° C. until the NCO content was=0. This gave an acetonic dispersion of a hydroxy-functional polyurethane. Following the addition of 25.3 g of dimethylethanolamine as neutralizing agent, the product was dispersed by addition of 900 g of demineralized water, and the acetone was then removed by distillation.

This gave a clear, aqueous, hydroxy-functional polyurethane solution having a urea group content of 12.7% by weight, a hydroxyl group content of 3.8% by weight (based in each case on solids content), a solids content of 51% by weight and a viscosity of 3800 mPas. The aqueous polyurethane solution was virtually solvent-free, with a pH of 7.8.

Polyurethane Solution 14)

A mixture of 23.9 g of butanediol, 270.3 g of polyester P200H and 19.5 g of dimethylolpropionic acid was diluted with 333 g of acetone and admixed at 40° C. with a mixture of 175.5 g of isophorone diisocyanate and 288.4 g of Desmodur® N 3300. It was stirred at 60° C. until the NCO content was slightly below the theoretical NCO content. This isocyanate-functional intermediate solution was diluted with 300 g of acetone and then incorporated with stirring into an initial charge mixture, introduced at room temperature, of 214 g of diethanolamine and 141 g of acetone over 30 minutes, the resulting mixture being stirred at 50° C. until the NCO content was=<0.1%. This gave an acetonic dispersion of a hydroxy-functional polyurethane. Following the addition of 12.9 g of triethylamine as neutralizing agent, the product was dispersed by addition of 5200 g of demineralized water, and the acetone was removed by distillation.

This gave a clear, aqueous, hydroxy-functional polyurethane solution having a urea group content of 11.7% by weight, a hydroxyl group content of 7.0% by weight (based in each case on solids content), a solids content of 66% by weight and a viscosity of 10000 mPas. The aqueous polyurethane solution was virtually solvent-free, with a pH of 6.6.

Performance Tests:

Crosslinker I): melamine resin Cymel 328 (Cytec Industries B. V., Rotterdam, Netherlands), 85% form Crosslinker II): Bayhydur® VP LS 2310 (Bayer MaterialScience AG, Leverkusen, Germany), hexamethylene diisocyanate trimer blocked with butanone oxime and dispersed in water, approximately 38% form Additol XW 395, flow control assistant (Cytec Surfaces Specialities, Brussels, Belgium) Surfynol 104E, defoamer, (Air Products and Chemicals, USA).

1) Testing of Freeze Stability a) The aqueous polyurethane solutions 1) and 13) were subjected to a deep-freezing cycle. This involved freezing samples in glass bottles at −78° C. in dry ice for an hour and then thawing them at room temperature for 3 hours. This cycle was repeated five times. Both solutions withstand this procedure completely intact; no changes were observed or measured.

b) The aqueous polyurethane solutions 1), 2), 9), 10), 13) and 14) were stored in a refrigerator at 0 to 4° C. for 3 weeks and then warmed to room temperature. All of the solutions withstand this storage completely intact; no changes were observed or measured.

c) The two aqueous polyurethane solutions 1) and 13) were frozen in glass bottles in a freezing compartment at −10 to −12° C. for two weeks and then thawed again. Both solutions withstand this procedure completely intact; no changes were observed or measured.

The dispersions of the invention differ from virtually all aqueous dispersions, which do not withstand freezing without product damage.

2) Technical Coatings Test Results

Varnish 1) 125.9 g of polyurethane solution 1), 24 g of crosslinker I), 1.79 g of Additol XW 395, 1.79 g of Surfynol 104E, 0.6 g of dimethylethanolamine and 63 g of distilled water were mixed intensively. This gave an aqueous, solvent-free clear varnish having a solids content of 47% and an ISO 5 efflux time of 39 s. The pH is 8.7. The clear varnish was stable on storage: after 10 days' storage at 40° C. the viscosity is 37 s, and the appearance of the varnish was unchanged.

Varnish 2) 126.5 g of polyurethane solution 3), 23.5 g of crosslinker 1) 1.18 g of Additol XW 395, 1.18 g of Surfynol 104E, 0.4 g of dimethylethanolamine and 34 g of distilled water were mixed intensively. This gave an aqueous, solvent-free clear varnish having a solids content of 53% and an ISO 5 efflux time of 41 s. The pH is 8.7. The clear varnish was stable on storage: after 10 days' storage at 40° C. the viscosity is 41 s.

Following application, the varnishes were flashed off at room temperature for 10 minutes and then baked for 30 minutes at 140° C. or, in a 2nd test series, at 160° C. for 30 minutes.

This gave coatings having very good flow and film optical properties, and also the following test results:

| 30`140° C. | Varnish 1) | Varnish 2) |
|---|---|---|
| Pendulum hardness s | 159 | 156 |
| Incipient dissolubility 1' | 0000 | 3333 |
| E value mm | 9.5 | 9.5 |

| 30`160° C. | Varnish 1) | Varnish 2) |
|---|---|---|
| Pendulum hardness s | 168 | 160 |
| Incipient dissolubility 1' | 0000 | 0002 |
| E value mm | 9.0 | 9.5 |
| Impact test | 80/80 | >80/>80 |
| Cross-cut | 0 | 0 |

The pendulum hardness or pendulum damping was measured by the Konig method in pendulum seconds (DIN 53157). The higher the value, the greater the hardness of the varnish film.

The incipient dissolubility was measured by exposure for 1 minute each to 4 different solvents:

Assessment:

0=nothing found, 1=slight softening (reversible),

2=moderate softening (reversible), 3=severe softening,

4=damage to the varnish, 5=varnish detached

The elasticity was determined by the Erichsen test in accordance with DIN 53156 and by an impact test. The higher the values, the greater the elasticity of the varnish film.

The cross-cut test according to DIN 53151 (0=best score; 5=worst score)=0 gives a statement concerning the quality of the adhesion The varnish films based on the aqueous polyurethane solutions of the invention exhibit high hardness even with curing at 140° C., with excellent elasticity at the same time. The resistance properties, particularly with curing at 160° C., and also the cross-cut values, are very good.

Varnish 3) 62.9 g of polyurethane solution 1), 87.2 g of crosslinker II), 1.29 g of Additol XW 395, 1.29 g of Surfynol 104E, 0.1 g of dimethyethanolamine and 39 g of distilled water were mixed intensively. This gave an aqueous, solvent-free clear varnish having a solids content of 38% and an ISO 5 efflux time of 38 s. The pH is 8.5. The clear varnish was stable on storage: after 10 days' storage at 40° C. the viscosity is 37 s, and the appearance of the varnish was unchanged.

Varnish 4) 43.2 g of polyurethane solution 3), 106.8 g of crosslinker II), 1.18 g of Additol XW 395, 1.18 g of Surfynol 104E, 0.4 g of dimethyethanolamine and 24 g of distilled water were mixed intensively. This gave an aqueous, solvent-free clear varnish having a solids content of 38% and an ISO 5 efflux time of 35 s. The pH is 8.5. The clear varnish was stable on storage: after 10 days' storage at 40° C. the viscosity is 34 s.

Varnish 5) 68.1 g of polyurethane solution 2), 88.2 g of crosslinker II), 1.21 g of Additol XW 395, 1.21 g of Surfynol 104E, 0.1 g of dimethyethanolamine and 21 g of distilled water were mixed intensively. This gave an aqueous, solvent-free clear varnish having a solids content of 40% and an ISO 5 efflux time of 40 s. The pH is 8.5. The clear varnish was stable on storage: after 10 days' storage at 40° C. the viscosity is 39 s.

Following application, the varnishes were flashed off at room temperature for 10 minutes and then baked for 30 minutes at 140° C. or, in a 2nd test series, at 160° C. for 30 minutes. This gave coatings having very good flow and film optical properties, and also the following test results:

| 30´ 140° C. | Varnish 3) | Varnish 5) | Varnish 4) |
|---|---|---|---|
| Pendulum hardness s | 120 | 68 | 107 |
| Incipient dissolubility 1' | 0024 | 0024 | 0004 |
| E value mm | 10.0 | 10.0 | 10.0 |
| Impact Test | 20/20 | >80/>80 | >80/>80 |
| Cross cut | 0 | 0 | 0 |

| 30´ 160° C. | Varnish 3) | Varnish 5) | Varnish 4) |
|---|---|---|---|
| Pendulum hardness s | 162 | 120 | 181 |
| Incipient dissolubility 1' | 0003 | 0003 | 0003 |
| E value mm | 10.0 | 10.0 | 10.0 |
| Impact Test | >80/>80 | >80/>80 | >80/>80 |
| Cross cut | 0 | 0 | 0 |
| Salt spray test on steel 144 h Scribe creep in mm/amount of blisters (0 to 5)/size of blisters (0 to 5) | 8/1/1 | 12/0/0 | 11/1/1 |

Varnish films were obtained which had excellent mechanical properties, high hardnesses particularly at 160° C., and excellent values for elasticity and for cross-cut. The properties of resistance to solvent exposure, and the resistances in the salt spray test, were both very good.

The aqueous polyurethane solutions 4), 9), 10), 11), 12) and 14) were mixed with crosslinker I). After one day's storage, films with a wet thickness of 240 μm were drawn down onto glass plates, flashed off at room temperature for 15 minutes and then baked at 150° C. for 20 minutes. After the films had been cooled to room temperature, a wipe test (100 double rubs with a cotton pad soaked with methyl ethyl ketone) was used to test the quality of crosslinking, and the pendulum hardness was determined as well:

| | Appearance of the film | 100 double rubs MEK | Pendulum hardness (sec) |
|---|---|---|---|
| Polyurethane solution 4) | clear, smooth, homogeneous | nothing found | 146 |
| Polyurethane solution 9) | clear, smooth, homogeneous | nothing found | 148 |
| Polyurethane solution 10) | clear, smooth, homogeneous | nothing found | 186 |
| Polyurethane solution 11) | clear, smooth, homogeneous | nothing found | 207 |
| Polyurethane solution 12) | clear, smooth, homogeneous | nothing found | 222 |
| Polyurethane solution 14) | clear, smooth, homogeneous | nothing found | 154 |

The varnish films obtained were very well crosslinked, with high or very high hardness. All of the films exhibited very good flow and were clear, smooth and homogeneous.

The invention claimed is:

1. A polyurethane system comprising
A) an aqueous solution of a water-soluble, hydroxy-functional polyurethane containing urea groups and having a hydroxyl group content in the range of from 2% to 10% by weight and a level of urea groups, calculated as —NH—CO—NH—, derived from amino alcohols having a primary or secondary amino group and at least one hydroxyl group in the range of from 3% to 20% by weight, based in each case on the weight of said hydroxy-functional polyurethane containing urea groups, wherein the aqueous solution has a solids content of from 65 to 75%;
B) a crosslinker which contains no free isocyanate groups and is optionally hydrophilicized; and
C) optionally, further aqueous dissolved and/or dispersed and/or organically dissolved, optionally hydroxy-functional oligomers and/or polymers.

2. The polyurethane system of claim 1, wherein said polyurethane system comprises
A) from 30% to 98% by weight of said aqueous solution of a water soluble, hydroxy-functional polyurethane containing urea groups;
B) from 2% to 70% by weight of an optionally hydrophilicized polyisocyanate crosslinker having blocked isocyanate groups and/or amino resin crosslinkers and/or urea resin crosslinkers; and
C) from 0% to 65% by weight of other aqueous or organically dissolved and/or dispersed, optionally hydroxyl-functional oligomers and/or polymers;
wherein the sum of the percentages of A), B), and C) equal 100% by weight and is based on the solids content of said polyurethane system.

3. The polyurethane system of claim 1, wherein said water-soluble, hydroxy-functional polyurethane containing urea groups is obtained by preparing a NCO-functional prepolymer by single-stage or multi-stage reaction of
a) at least one hydroxy- and/or amino-functional hydrophilicizing agent having at least one acid group and/or the salt of an acid group, or having at least one tertiary amino group and/or the salt of a tertiary amino group;
b) at least one polyol;
c) at least one polyisocyanate; and
d) optionally, other hydroxy- and/or amino-functional compounds, different from a), b), and e);
and reacting said NCO-functional prepolymer with
e) an amino alcohol component comprising an amino alcohol having a primary or secondary amino group and at least one hydroxyl group, wherein the fraction of amino alcohols having a secondary amino group, based on the total amount of e), is at least 60% by weight;
wherein the tertiary amino groups or acid groups in the resulting water soluble, hydroxy-functional polyurethane containing urea groups which originate from a) are optionally present in their salt form as a result of whole or partial neutralization.

4. The polyurethane system of claim 1, wherein said aqeuous solution of a water-soluble, hydroxy-functional polyurethane containing urea groups is obtained by preparing a NCO-functional prepolymer by single-stage or multi-stage reaction of
a) at least one hydroxy- and/or amino-functional hydrophilicizing agent having at least one acid group and/or the salt of an acid group, or having at least one tertiary amino group and/or the salt of a tertiary amino group;
b) at least one polyol;
c) at least one polyisocyanate; and
d) optionally, other hydroxy- and/or amino-functional compounds, different from a), b), and e);
reacting said NCO-functional prepolymer with
e) an amino alcohol component, comprising an amino alcohol having a primary or secondary amino group and at least one hydroxyl group, wherein the fraction of amino alcohols having a secondary amino group, based on the total amount of e), is at least 60% by weight;
and dissolving the resulting water soluble, hydroxy-functional polyurethane containing urea groups in water, wherein said dissolution is preceded or accompanied by the reaction of the acid groups or tertiary amino groups of a) with a neutralizing agent.

5. The polyurethane system of claim 3, wherein component e) is an amino alcohol having exclusively one secondary amino group and one or two hydroxyl groups.

6. The polyurethane system of claim 1, wherein B) is an amino crosslinker resin and/or a urea crosslinker resin or a crosslinker resin containing blocked NCO groups.

7. A polyurethane obtained from the polyurethane system of claim 1.

8. The polyurethane of claim 7, wherein said polyurethane is a paint, coating material, sealant, liquid ink, printing ink, size, adhesion promoter, or reactive diluent applied in one or more layers.

9. A substrate coated with the polyurethane of claim 7.

10. The polyurethane system according to claim 1, wherein the aqueous solution has a solids content of 67 to 75%.

11. The polyurethane system according to claim 3, wherein:
a) is selected from the group consisting of 2-(2-aminoethylamino)ethanesulfonic acid, the adduct of IPDA and acrylic acid, dimethylolpropionic acid and hydroxypivalic acid;
b) is a hydroxy-functional compound selected from the group consisting of:
b1) polyesters,
b2) low molecular weight compounds with molecular weights of 62 to 500 g/mol,
b3) polycarbonates,
b4) C2 polyethers, C3 polyethers, and
b5) C4 polyethers;

and wherein the aqueous solution has a solids content of 67 to 75%.

* * * * *